UNITED STATES PATENT OFFICE.

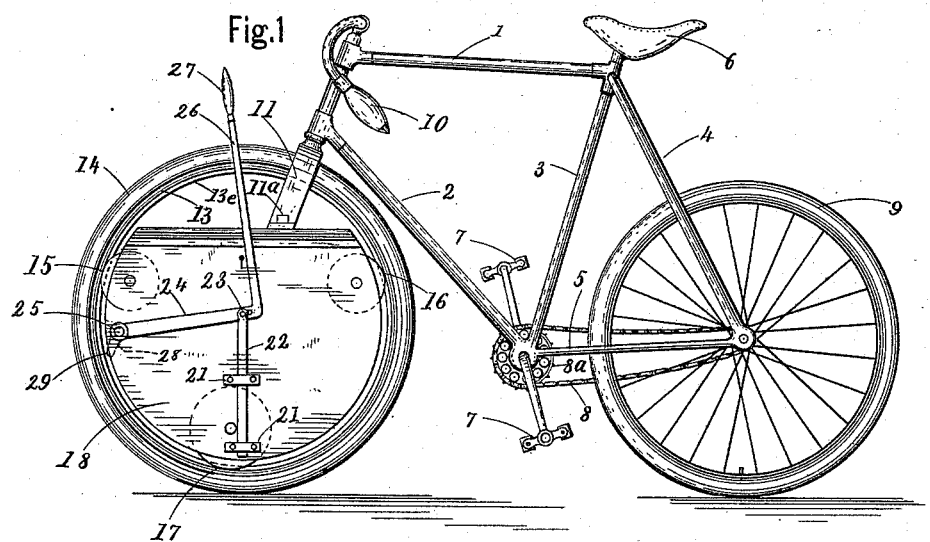

LAWSON ADAMS, OF BUFFALO, NEW YORK, ASSIGNOR TO HIMSELF, ALEXANDER GLEASON, AND WILL P. SMITH, OF SAME PLACE.

VEHICLE FOR CARRYING LIGHT LOADS.

SPECIFICATION forming part of Letters Patent No. 537,957, dated April 23, 1895.

Application filed December 26, 1894. Serial No. 532,937. (No model.)

*To all whom it may concern:*

Be it known that I, LAWSON ADAMS, a citizen of the United States, residing at Buffalo, in the county of Erie and State of New York, have invented certain new and useful Improvements in Vehicles for Carrying Light Loads, of which the following is a specification.

My invention relates to certain improvements in vehicles for carrying light loads, for instance, mail matter, store parcels or other matter, all of which will be fully and clearly hereinafter described and claimed, reference being had to the accompanying drawings, in which—

Figure 1, represents a bicycle having my invention connected therewith. Fig. 2, is a vertical longitudinal section on or about line $a\,a$, Fig. 3, through the parcels or load carrier, showing a side elevation of the interior construction of the same. Fig. 3, represents a detached rear end elevation of the load or parcels carrier. Fig. 4, represents a portion of the bicycle wheel rim and tire, and a part of the package or load carrier, showing a portion broken out to expose the brake, and a section through the brake shaft. Fig. 5, is a cross section through the tire and wheel rim in or about line $a\,a$, Fig. 4, all parts beyond the section being omitted, showing also an inner under-side elevation of the forked bicycle brake, and a side elevation of the brake shaft and a portion of the handle for operating the brake.

The invention is designed to be used with an ordinary bicycle, the frame pieces 1, 2, 3, 4 and 5, being constructed and secured together in the usual manner. 6 represents the saddle; 7, the pedals, 8 and $8^a$, the chain and sprocket gear. 9 is the rear wheel and 10, the steering handles, all of which are of well known construction and consequently require no further description here. The bicycle fork 11, is also constructed in a similar manner as an ordinary bicycle fork, with the exception that it is made shorter and is rigidly secured to a parcel holder or load carrier by bolts $11^a$.

The front wheel is made in the form of a rim 13, provided with a rubber tire 14. Within the rim 13, is secured by grooved rollers 15, 16 and 17, the package holder, or load carrier.

The load carrier consists of a box or receptacle 18, of any suitable form, the preferred form being represented in the drawings, but it may be square, or of any desired shape, with the exception of that portion adapted to fit within the rim of the wheel.

The lower grooved roller 17, is mounted in suitable bearings in the package holder. The rollers 15 and 16, are also mounted in the package holder but in adjustable boxes $18^a$, which are adjusted by the set screws 19. See Fig. 2. The object of the adjusting screws 19, is to provide the means for adjusting the rollers 15 and 16, so that they may be adjusted to fit the wheel rim and run smoothly therein, and also to provide a suitable means for the removal of the package holder when required.

The rollers 15, 16 and 17, may be mounted in ball bearings if desired and thereby made to run with as little friction as possible.

At the top of the package holder is hinged either one or two covers 20 and $20^a$, but one may be used if desired. These covers are provided with a lock and key, a spring lock being preferred.

On one or both sides of the package holder is secured by holding pieces or slideway boxes 21, so as to be easily moved up or down therein, a supporting foot 22, which is let down to support the bicycle in an upright position when at rest. At the top of the supporting feet 22, is pivoted by a pin 23, a substantially horizontal arm 24. An end view of the mate to the arm 24, is shown in Fig. 3, and is indicated by the character $24^a$, for reasons which will appear farther on. These arms 24 and $24^a$, are rigidly secured to a shaft 25, which extends through the package holder and is mounted in suitable well known boxes. The arm 24, is provided with another arm 26, which extends upward and is either made in one piece with the arm 24, as shown in Fig. 1, or it may be rigidly secured to it. It is provided at the top with a handle 27, for operating it.

In or about the center of the package holder is rigidly secured to the shaft, 25, a forked brake 28.

The forked portion 29, of the brake 26, is adapted to pass through the side of the package holder and clutch over each side of the wheel rim track 13ᵉ, substantially as shown in Figs. 4 and 5, and thereby hold the wheel securely when the handle 27, is pulled toward the operator.

The operation of the device will be easily understood from the foregoing description and drawings, the bicycle being propelled in the usual way. When it is desired to stop it, lower the supporting feet, and set the brake. All that is required to be done is to stop the movement on the pedals and draw the handle 27, forward as hereinbefore described.

The parcels carrier may be easily taken from the wheel when required by adjusting the boxes 18ª, so as to bring the rollers away from the rim track 13ᵉ, and it may be moved from the bicycle fork by removing the bolts 11ª.

I claim as my invention—

1. The combination with a bicycle, of a package holder secured to the bicycle fork and mounted on grooved rollers adapted to run on a substantially U shaped track extending entirely around the inner side of the rim of the wheel, substantially as described.

2. The combination with a bicycle, of a package holder having its top rigidly secured to the bicycle fork and provided with a series of grooved rollers which run and are supported on an inner endless track forming a part of the hubless rim of the wheel, and means for adjusting a portion of the series of said rollers, substantially as and for the purposes described.

3. The combination with a bicycle, having a forward hubless wheel or rim, a track extending the entire circuit of inner side of said rim, a package holder secured to the bicycle fork and provided with a series of grooved rollers mounted in suitable boxes thereon, and adjusted to fit and run on said inner rim track, a shaft mounted transversely in said package holder in suitable boxes, a forked brake rigidly secured to said shaft and adapted to clutch the rim track, and means substantially as above described for operating it.

4. A package holder provided with a cover and means for locking it, and a series of grooved rollers mounted in suitable boxes at the bottom and sides thereof, in combination with a cycle wheel rim having an inner rim track extending around the inner side of the same upon which the grooved wheels are mounted and support the package holder within the rim, and means for securing the package holder to a cycle fork, substantially as described.

5. The combination with a bicycle, of a package holder secured to the bicycle fork, a series of grooved rollers mounted on said package holder, a wheel rim having an inner endless track upon which the grooved rollers are mounted and support the package holder, vertically movable feet on the package holder for keeping the bicycle in an upright position when at rest, and means substantially as described for operating them.

6. The combination with a bicycle, of a hubless wheel at the front of the same, an endless track extending around the inner side of the wheel rim, a package holder secured to the bicycle fork and mounted on grooved rollers adapted to run on the endless track within said rim, a shaft extending transversely through the package holder, a forked brake rigidly secured to said shaft adapted to clutch the said endless track, two substantially horizontal arms rigidly secured to said shaft, two vertically movable feet having their upper ends pivoted to the free ends of the said arms, and an upright arm provided with a handle adapted to be grasped by the hand, whereby when said handle is moved toward the operator, the brake is brought into action and the feet are lowered down at the same time, for the purposes described.

LAWSON ADAMS.

Witnesses:
JAMES SANGSTER,
HENRY ASHBERY.